US011040425B2

(12) United States Patent
Lause

(10) Patent No.: US 11,040,425 B2
(45) Date of Patent: Jun. 22, 2021

(54) ON-MACHINE INSPECTION INDICATOR SETUP BLOCK

(71) Applicant: Shawn Thomas Lause, Leslie, MO (US)

(72) Inventor: Shawn Thomas Lause, Leslie, MO (US)

(*) Notice: Subject to any disclaimer, the term of this patent is extended or adjusted under 35 U.S.C. 154(b) by 217 days.

(21) Appl. No.: 16/419,772

(22) Filed: May 22, 2019

(65) Prior Publication Data
US 2019/0358762 A1 Nov. 28, 2019

Related U.S. Application Data

(60) Provisional application No. 62/674,712, filed on May 22, 2018.

(51) Int. Cl.
G01B 5/25 (2006.01)
B23Q 17/22 (2006.01)
G01B 5/12 (2006.01)

(52) U.S. Cl.
CPC ........ B23Q 17/225 (2013.01); B23Q 2717/00 (2013.01); G01B 5/12 (2013.01)

(58) Field of Classification Search
CPC ........... B23Q 17/225; G01B 5/24; G01B 5/25
USPC .......................................................... 33/645
See application file for complete search history.

(56) References Cited

U.S. PATENT DOCUMENTS

| 3,995,528 A * | 12/1976 | Rethwish | B23Q 35/102 409/80 |
| 4,715,125 A * | 12/1987 | Livick | B23B 47/287 33/197 |
| 6,109,839 A * | 8/2000 | Thomas | B23B 49/02 33/562 |
| 2004/0128850 A1* | 7/2004 | Joo | B25J 17/0208 33/644 |
| 2014/0366395 A1* | 12/2014 | Ward | E04F 21/003 33/613 |
| 2017/0307348 A1* | 10/2017 | Lause | G01B 5/08 |
| 2019/0078879 A1* | 3/2019 | Lause | G01B 21/042 |

* cited by examiner

Primary Examiner — George B Bennett

(57) ABSTRACT

The invention of a device has four threaded bolts that engage cooperatively threaded apertures in a base. These thread bolts hold the device in a temporary yet stationary position. The device has non-magnetic metal which allows test indicators to display accurate results free from any magnetic fields. The device has a precision bore of a nominal size. The radial value of the nominal size precision bore provides for mathematical calculation of the spindle centerline to work piece distance for measuring. The device has undercuts on both of its sides to aid in removing by hand. These undercuts allow the device to pivot from its stationary position for removal without damaging the planar surface. Alternatively, the device has four magnetic inserts, pocketed upwardly from the bottom surface.

20 Claims, 11 Drawing Sheets

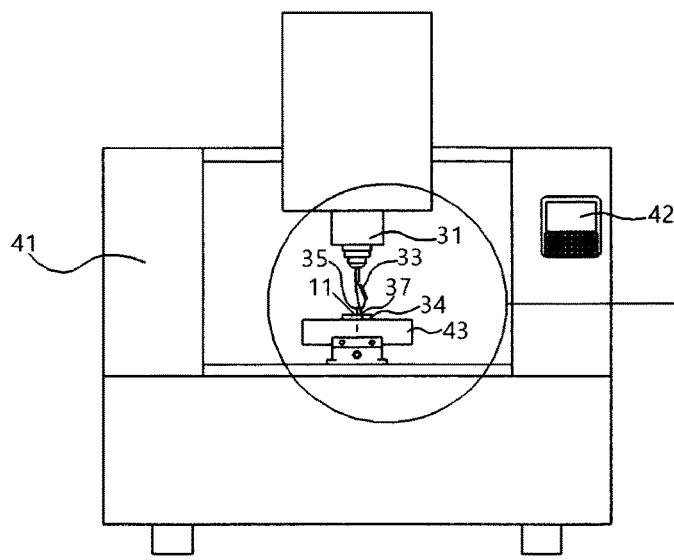 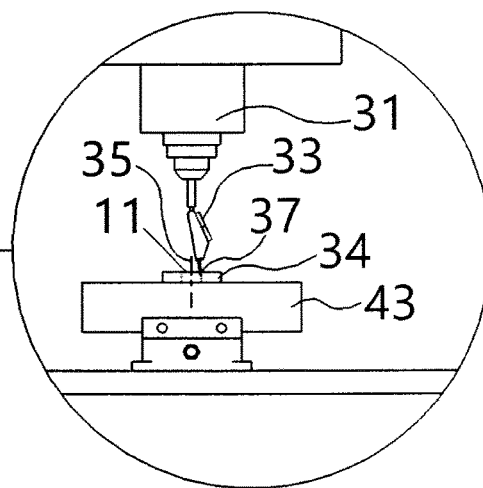
FIG. 9      FIG. 9a
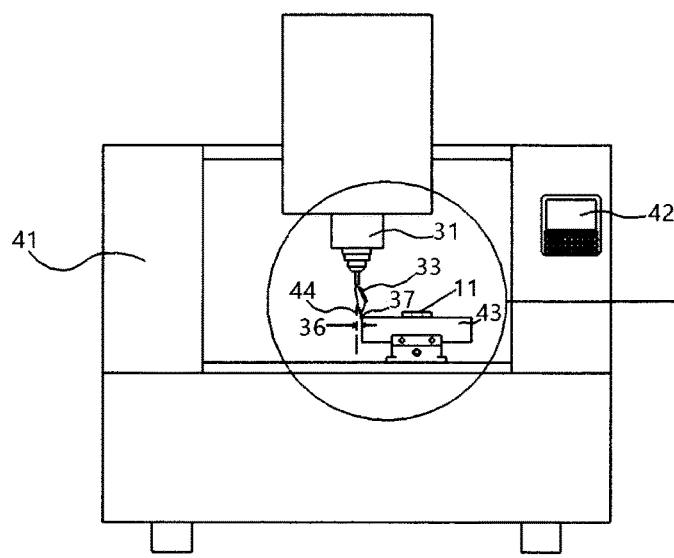 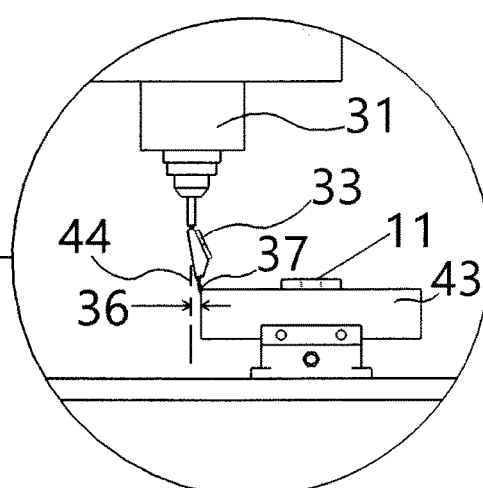
FIG. 10      FIG. 10a

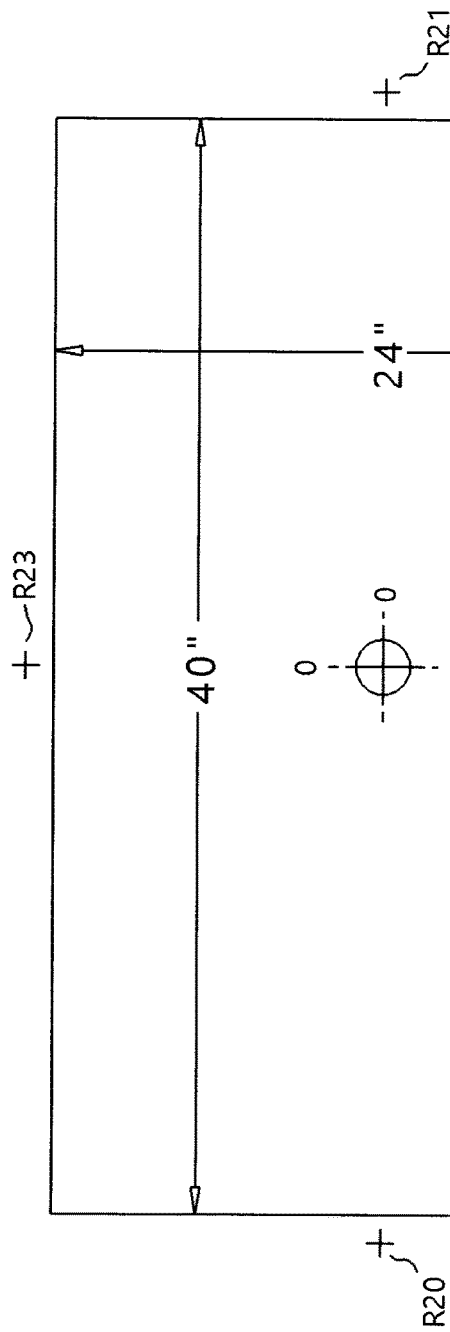

ON-MACHINE INSPECTION INDICATOR SETUP BLOCK

CROSS-REFERENCE TO RELATED APPLICATION

This non-provisional application claims priority to pending provisional application No. 62/674,712 filed on May 22, 2018 which is owned by the same inventor.

FIELD OF THE INVENTION

The present invention relates to a precision machined internal diameter gage. The device is used to precisely setup a test indicator on a machine tool spindle. The device determines the precise diameters of cutting tools

BACKGROUND OF THE INVENTION

The manufacturing of work pieces with machine tools offers precisions repeatable results. To qualify these results, operators must use hand tools and other precision instruments to inspect work pieces before, during, and after machining processes. Hand tools, such as micrometers and calipers, have regular use by machinists however that introduces human error during routine usage.

In the die/mold industry, many work pieces have mating features which require high tolerance dimensions. The outside periphery of parts commonly requires this precision tolerance. These surfaces must stay within their given tolerance despite tool wear and tool deflection.

Machinists use micrometers to qualify the outside periphery of parts however at less accuracy than test indicators. Work pieces may have too large a size to accurately measure with a micrometer due to micrometer weight, availability, and the design of the profile.

Test indicators work extremely well transferring measurements. Test indicators have common usage on surface plates to transfer dimensions from a known gage. This practice eliminates human error and provides high quality inspection results. Test indicators also see use in machine tools to locate origins and reference surface edges. Test indicators work well for aligning fixtures, such as machine vises, and for verifying flatness. Flatness verification works very well; however, it does not provide actual measurements.

Tool probes also assist machinists to measure machined features on machine tools. Tool probes have designs and designations for specific machine tools. Therefore, tool probes interchange less between different machine tools compared to test indicators. The machine specific hardware and software required to operate tool probes limits their efficiency because they required well trained, skilled operators. Because of machine specific design hardware and software, tool probes have become too costly to use on all machine tools.

SUMMARY OF THE INVENTION

The invention is a mechanical device used to align a test indicator from a spindle centerline to transfer a measurement for accurately measuring surfaces on a machine tool. The device locates on any planar surface on a machine tool with a magnetic attraction to prevent the device from moving. Magnetic inserts recessed on the bottom of the device provide this magnetic attraction without distorting the device's flatness. The precision bore located in the center of the device provides a radial measurement for a test indicator. The precision bore has a nominal size as the bore's radius becomes the mathematical value for calculating measurements. This radial measurement cooperates with a digital readout of the machine tool to position a work piece a certain radial distance from a surface. The undercuts on the two sides of the device allow for hand removal without scratching and damaging an underlying surface.

There has thus been outlined, rather broadly, the more important features of the invention in order that the detailed description thereof that follows may be better understood and that the present contribution to the art may be better appreciated. The present invention also includes a precision bore, usage of the bore in a magnet style device or a base style device, and accurate concentricity. Additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a gage device to setup and transfer measurements with a test indicator for measuring surfaces on work pieces in machine tools.

Another object of the present invention is to provide a device easily set in place by hand and that has versatility across all machine tools.

Another object of the present invention is to overcome counter-productivity to re-setup work pieces in machine tools due to out of tolerance dimensions.

Another object of the present invention is to accommodate long, oversize work pieces that become difficult, and sometimes impossible, to measure with hand tools thus this device allows a machine tool to become a qualified measuring machine.

Another object of the present invention is to provide a gage device to setup work piece origins in a machine tool.

Another object of the present invention is to align a test indicator at a precise radial distance from the spindle centerline using the device which turns the test indicator into a precision edge finder, thus a machinist finds work piece origins using one surface for part setup.

Another object of the present invention is to establish a temporary datum for work pieces in machine tools.

Another object of the present invention is to accommodate work pieces of a size too large to perform all the operations in a machine tool with one given setup in contrast to current practice of work pieces going unclamped, shifted, and then reclamped again.

Another object of the present invention is to avoid mismatch between origin setups that become a variable and affect quality.

Another object of the present invention is to provide a way to establish a datum without permanently altering the work piece.

The present invention has a flat device with a precision bore. The device has a top surface and a bottom surface both parallel with each other so the operator can verify flatness of the gage prior to aligning the test indicator. The bottom surface of the device has a relief in the center area to prevent dirt and debris from causing inaccurate setups. The relief allows the device to rest flat using the bottom surface outwardly of the relief, or outer land, upon the sides and ends. The bottom of the device has pockets for magnetic inserts. The magnetic inserts hold the device in place during the inspection operation. The magnetic inserts have enough strength to hold the device in place yet offer limited resistance for hand removal of the device.

The device has a non-magnetic metal construction. The Applicant specifies this because of the test indicator's contact and use with the device. The test indicator has vulnerability to magnetic fields. Magnetic pulls can distort the test indicator stylus from providing accurate results. Using a non-magnetic metal prevents the test indicator from displaying any readings outside mechanical measurements.

Throughout a machining process, qualifying features upon their machining leads to a precise product. Establishing in-tolerance dimensioned features during the machining process has a number of benefits. The thermal changes in a machine tool no longer become a variable. Over the course of a day, thermal changes in machine tools can cause the part setup origin or datum to change based on the quality of the machine tool. Cutting tool life also appears more identifiable during the sizing of dimensional features. Cutting tool life and tool wear then appear most identifiable immediately following with on-machine inspection processes. Changes with the machine tool operators can also lead to uninformed critical details that affect the final work piece. Machine tool operators can produce quality work pieces when they knowingly have an accurate part origin, understand the quality of cutting tool, and precisely inspect their work. The present invention allows operators to inspect work pieces during the machining operation eliminating thermal issues, cutting tool identification issues, and operator change issues.

The device serves as a precision instrument that provides repeatable results for all machine tool operators. Using the device requires little to no fine adjustments to measure work piece surfaces. The device has versatility compatible with machine tools that utilize a spindle and a digital readout.

Test indicators have use on surface plates to transfer measurements from one high peak to another. The test indicator has a loading using a gage block to transfer this measurement. This high quality practice has become routine for many in the trade. The present invention uses a test indicator in a machine tool spindle. The present invention abuts a test indicator loaded at a constant radial contact point to establish its radial measurement. The machinist then transfers this radial measurement to work pieces at the test indicator's highest peak of contact to find a measurement. The present invention takes a constant radial value from a precision bore and applies it to the highest peak of contact at a radial distance from a surface.

BRIEF DESCRIPTION OF DRAWINGS

In referring to the drawings,

FIG. 9 is a front view of a machine tool having the invention placed beneath a spindle;

FIG. 9a is detail view of FIG. 9;

FIG. 10 is a front view of a machine tool having the invention placed to the side of a spindle;

FIG. 10a is a detail view of FIG. 10;

FIG. 11 is a top view of a work piece surface to verify the present invention; and, FIG. 12 is a table of results from verifying the present invention.

The same reference numerals refer to the same parts throughout the various figures

DETAILED DESCRIPTION OF THE INVENTION

The foregoing features, object, and advantages of the invention will become apparent to those skilled in the trade from the following detailed description of the preferred embodiment, especially when considered in conjunction with the accompanying drawings.

The present invention, On-Machine Inspection Indicator Setup Block, provides a repeatable way of measuring work piece surfaces on machine tools.

Figure 1A:
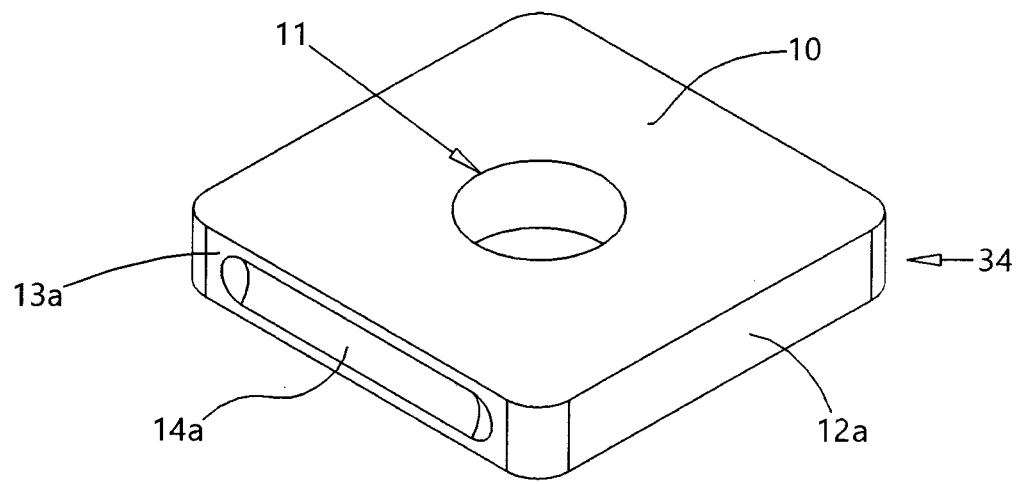
FIG. 1A is a top perspective view of the alternate embodiment of the invention.

FIG. 1A shows a top perspective view of the alternate embodiment of the present invention 34. The invention has a body here shown in isometric as a prismatic square with rounded corners. The device has a top surface 10 shown with a precision bore 11 located in the center. The precision bore 11, centered on the device, has a nominal size that communicates through the entire device. The precision bore 11 has a circularity less than 0.0001 in (one ten-thousandths of an inch) of total indicator readout. Rotating a test indicator from the precision bore's centerline at a complete revolution from zero to three hundred sixty degrees, the indicator reading must not deviate more than 0.0001 in (one-ten thousandths of an inch). The precision bore 11 is sized within 0.0002 in (two ten-thousandths of an inch) and has a surface finish of 32 RMS, root mean square of profile height deviation from the mean line, or better. This surface finish provides smooth uninterrupted test indicator measurements. The high tolerance of the precision bore 11 along with a smooth finish allows the test indicator to accurately transfer radial measurements from known machine tool positions. The precision bore 11 is perpendicular to the top surface 10. The top surface 10 has precision machining performed on it so the surface ensures the device rests flat during use. The top surface 10 has an orientation to the face of a machine tool spindle during use, as later shown in FIGS. 7-10a. Once a machinist verifies the top surface 10 surface as flat during use, the device ensures the precision bore 11 has a square orientation with a machine tool spindle. The device has a side 13a perpendicular to the top surface and spaced outwardly from the bore 11. The device's side 13a appears in the figure with an undercut 14a shown inwardly towards the bore 11. The undercut 14a assists a machinist in handling and removing the device from a planar surface. Perpendicular to the side 13a and the top surface 10, the device has its end 12a. The device has a non-magnetic metal construction.

Figure 2A:
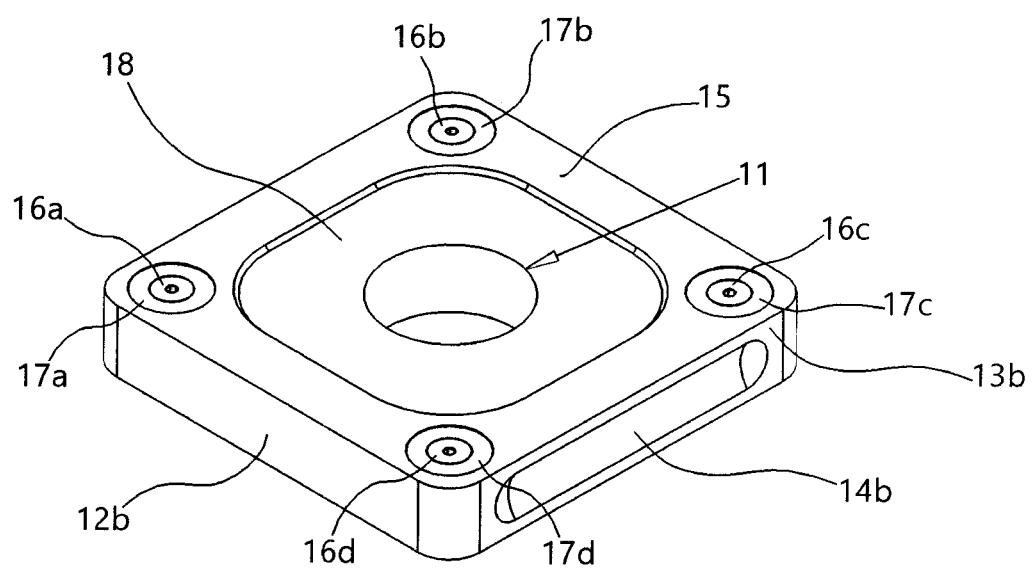
FIG. 2A is a bottom perspective view of the alternate embodiment.

FIG. 2A shows a perspective view of the alternate embodiment of the present invention opposite that of FIG. 1A. The device's bottom surface 15 appears as an isometric with the precision bore 11 positioned in the center. The bottom surface is planar and mutually parallel and opposite to the top surface 10, not shown. The bottom surface 15 has a centered relief area 18 as a recess into the bottom surface 15. This relief area 18 helps the device to rest flat on a planar surface. The relief area 18 lessens the amount of surface contact from the bottom surface 15 allowing for better setups by a machinist. The device has another side as at 13b here shown with another undercut, as at 14b. This other side 13b has a mutually parallel and spaced apart position from the side 13a previously shown. The undercut 14b serves as the second undercut on the device and has an opposite position from undercut 14a, 180 degrees from each other, as shown in FIG. 1a. Each side has an undercut. The undercut 14b travels the majority of the side 13b and has a smooth transition without sharp edges so that a machinist's fingers readily grasp the invention. Perpendicular to the side 13b, the device has its other end 12b. The end 12b has a mutually parallel and spaced apart position from the end 12a previously shown. The two sides 13 and the two ends 12 cooperatively define the rim of the invention. The device's bottom surface 15 has four magnetic inserts 17a, 17b, 17c, and 17d having an even spacing from each other. The magnetic inserts 17a, 17b, 17c, and 17d rest below the device's bottom surface 15 and fasteners 16a, 16b, 16c, and 16d respectively hold their inserts in place. The fasteners operate as a connector and preferably the fasteners are threaded bolts. The magnetic inserts 17a, 17b, 17c, and 17d rest below the bottom surface so the bottom surface 15 rests flat on a planar surface for optimum device performance.

Figure 3A:
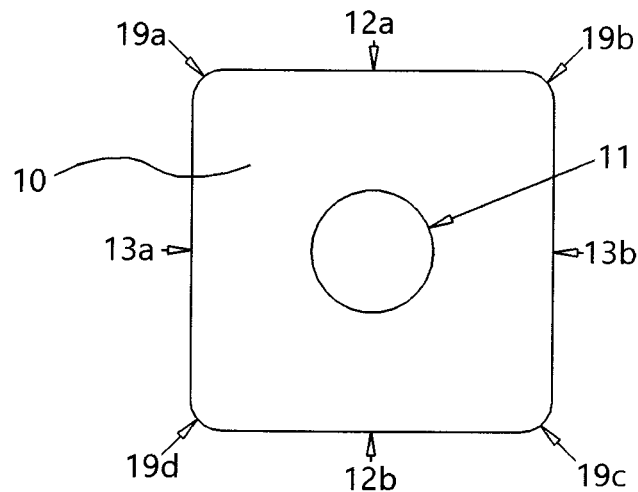
FIG. 3A is a top view of the alternate embodiment.

FIG. 3A is a top view of the alternate embodiment of the present invention 34. The precision bore 11 has its centered position in the device as before. The top surface 10 is flat and planar that has a 32 RMS finish or better. This top surface indicates whether the device has a flat orientation before a machinist's use. The outside profile of the device, or rim, has the two ends 12a and 12b as well as the two sides 13a and 13b as previously described. The device's ends 12a and 12b are square to the device's sides 13a and 13b, that is perpendicular. The device has corners shown at 19a, 19b, 19c, and 19d where a side and an end merge and each corner has a radius which transition the device's ends 12a and 12b to the device's sides 13a and 13b. The corners 19a, 19b, 19c, and 19d have a convex shape providing a smooth feature with no sharp edges. These smooth features provide sharp free corners, comfortable for a machinist to handle.

Figure 4A:
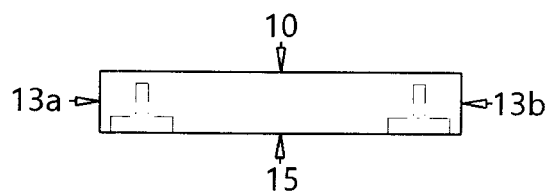
FIG. 4A is a front view of the alternate embodiment.

FIG. 4A is a front view of the alternate embodiment of the present invention. The device's bottom surface 15 has its parallel orientation to the top surface 10. Both the top surface 10 and the bottom surface 15 are flat, planar surfaces. These surfaces have their parallel orientation within 0.0002 in (two ten-thousands and an inch), an accuracy beyond that shown in these drawings themselves. During use, the top surface 10 verifies that the device has a flat placement upon another planar surface. With the top surface parallel to another surface, the Applicant asserts that the bottom surface 15 has a flat orientation matching that of the top surface 10. This figure also shows the two mutually parallel and spaced apart sides 13a, 13b. This figure also shows in dotted line form the magnetic insert and fastener at each corner.

Figure 5A:
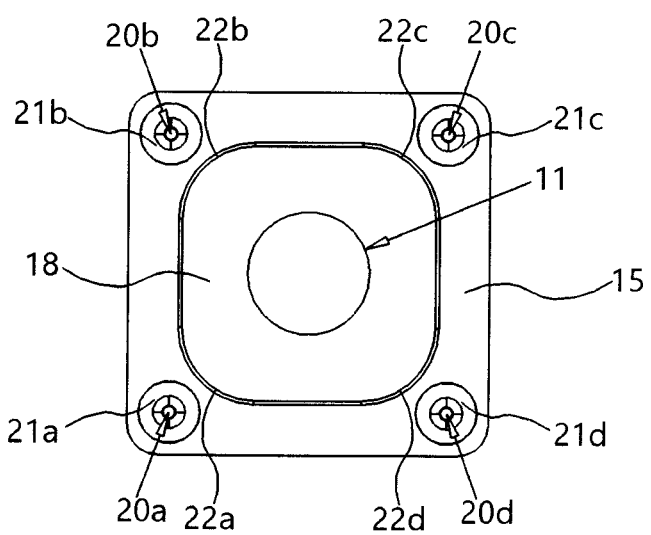
FIG. 5A is the bottom view of the alternate embodiment.

FIG. 5A shows a bottom view of the alternate embodiment of the present invention. With a direct reverse image from the top view of FIG. 3a, the precision bore 11 has its position in the center of the device. In this view, the figure omits the magnetic inserts thus allowing the reader to see how the four pockets receive the inserts. The pockets 21a, 21b, 21c, and 21d have the form of blind apertures for the magnetic inserts. The pockets have a round shape and spacing evenly from each other. The pockets 21a, 21b, 21c, and 21d also have blind threaded apertures 20a, 20b, 20c, and 20d located in their centers. These threaded apertures 20a, 20b, 20c, and 20d receive cooperating threaded fasteners to retain the magnetic inserts in place. Preferably, the pockets have a symmetric arrangement about the center of the device. The relief area 18 represents a relatively thin amount of material removed from the device's bottom surface 15. The relief area consumes the majority of the center of the device's bottom surface leaving a profile of the bottom surface 15 around the outside of the device. The relief area 18 avoids interference between the pockets 21a, 21b, 21c and 21d and the relief area's radii as at 22a, 22b, 22c, and 22d. The radii 22a, 22b, 22c, and 22d allow for a larger relief area 18 without interfering with the pockets 21a, 21b, 21c, and 21d.

Figure 1B:
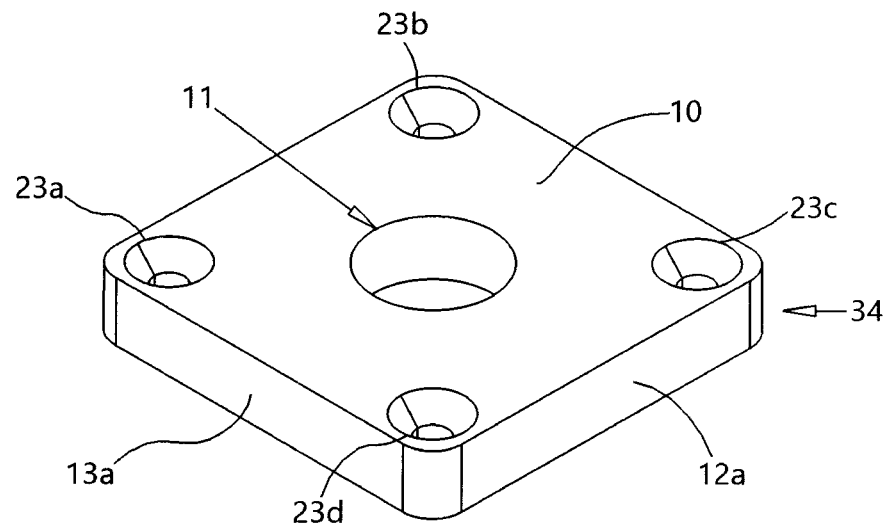
FIG. 1B is a top perspective view of an preferred embodiment of the invention.

FIG. 1B shows a perspective view of the preferred embodiment of the invention using threaded fasteners as later shown. This embodiment has similar form as the alternate embodiment with a body 34 having a top surface 10, the centered precision bore 11, an end 12a, and a side 13a. The precision bore 11 has its nominal size aperture communicating through the device as before. The precision bore 11 has a size to within 0.0002 in (two ten-thousandths of an inch) and has a surface finish of 32 RMS or better. The precision bore 11 is perpendicular to the top surface 10. The top surface 10 has precision machining as before for its use to ensure the device rests flat when oriented to the face of a machine tool spindle during use. Unlike the preferred embodiment, this side 13a does not have an undercut. Perpendicular to the side 13b, the device has its other end 12b. The end 12b has a mutually parallel and spaced apart position from the end 12a previously shown. The two sides 13 and the two ends 12 cooperatively define the rim of the invention. Preferably, the ends and the sides each have the same length. The top surface 10 has corners where the ends 12a, 12b and the sides 13a, 13b meet. Proximate each corner, the top surface has a countersunk threaded aperture as at 23a, 23b, 23c, 23d. The apertures 23a, 23b, 23c, 23d communicate to the bottom surface. The device has a non-magnetic construction as before.

Figure 2B:
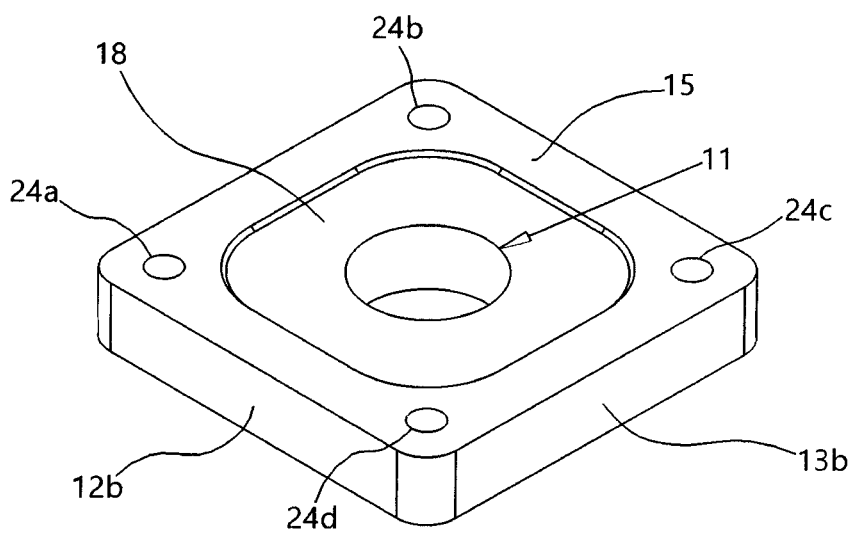
FIG. 2B is a bottom perspective view of the preferred embodiment.

FIG. 2B describes a bottom perspective view of the preferred embodiment opposite FIG. 1B. The device's bottom surface 15 has the centered precision bore 11 in the centered relief 18 area recessed into the bottom surface. This relief area has its purpose of before to assist the device in resting flat on a planar surface. The device has another side 13b and another end 12a shown. The side and the end in this figure have a mutually parallel and spaced apart orientation to the side and the end of FIG. 1B. The other side 13b omits an undercut compared to the preferred embodiment. The apertures from the top surface open to the bottom surface 15 proximate the corners showing their exits as at 24a, 24b, 24c, 24d. The exits have a round shape of lesser diameter than the countersink shown in FIG. 1b. The exits 24 cooperate with the bottom surface 15 so that the device rests flat on another planar surface.

Figure 3B:
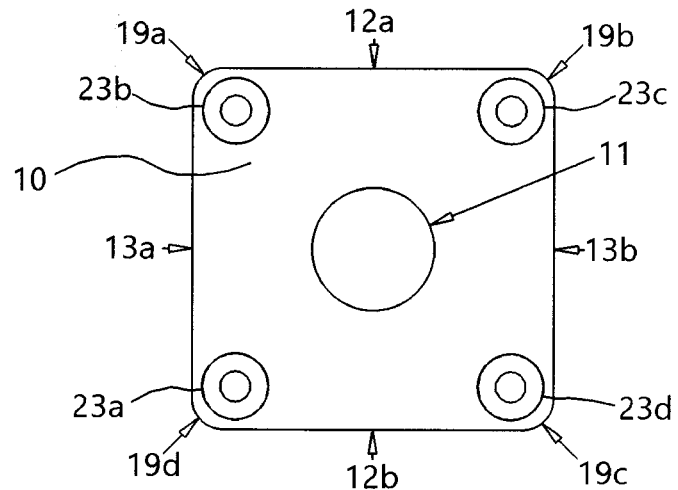
FIG. 3B is a top view of the preferred embodiment.

FIG. 3B is the top view of the preferred embodiment of the present invention 34. The precision bore 11 has its centered position in the top surface 10 where that is flat and planar with a 32 RMS finish or better. This top surface has usage to indicate whether the device has a flat orientation before a machinist's use. The outside profile of the device has two ends 12a and 12b as well as two sides 13a and 13b. The device's ends 12a and 12b have a square orientation to the device's sides 13a and 13b. The device's corners as at 19a, 19b, 19c, and 19d each have a radius which transition the device's ends 12a and 12b to the device's sides 13a and 13b as shown. The corners 19a, 19b, 19c, and 19d have a convex shape providing no sharp edges thus making the corners smooth and comfortable for manual handling. Each corner shows a cooperating aperture 23a, 23b, 23c, 23d.

Figure 4B:
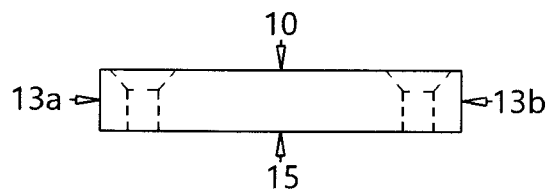
FIG. 4B is a front view of the preferred embodiment.

FIG. 4B is the front view of the preferred embodiment. The device's bottom surface 15 has its parallel orientation to the device's top surface 10 as before and both surfaces 10, 15 are flat thus providing parallel within 0.0002 in (two ten-thousands and an inch). During use, the top surface 10 verifies that the device has a flat placement upon another planar surface. With the top surface parallel to another surface, the Applicant asserts that the bottom surface 15 has a flat orientation matching that of the top surface 10. This figure also shows the two mutually parallel and spaced apart sides 13a, 13b. This figure also shows in dotted line form two apertures and their cooperating exits.

Figure 5B:
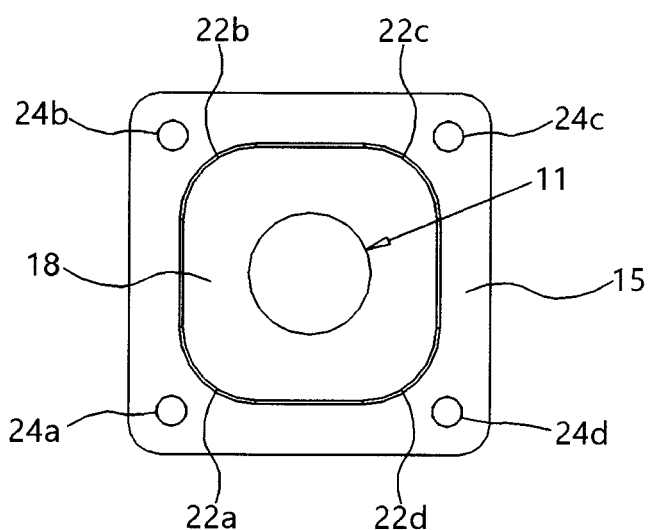
FIG. 5B is the bottom view of the preferred embodiment.

FIG. 5B illustrates a bottom view of the preferred embodiment. With a direct reverse image from the top view of FIG. 3b, the precision bore 11 has its centered position as before. The bottom surface shows the four exits 24a, 24b, 24c, 24d proximate their respective corners. Each exit communicates to a countersunk aperture into the plane of this figures. These countersunk apertures receive cooperating threaded fasteners as later shown. Preferably, the exits, and their cooperating apertures have a symmetric arrangement about the center of the device. The relief area 18 represents a relatively thin amount of material removed from the device's bottom surface 15 and leaves a profile of the bottom surface 15 around the outside of the device. The relief area 18 avoids interference between the exits 24a, 24b, 24c, 24d and the relief area's radii as at 22a, 22b, 22c, and 22d. The radii allow for a larger relief area 18 without interfering with the countersunk apertures and their cooperating exits.

Figure 6A:
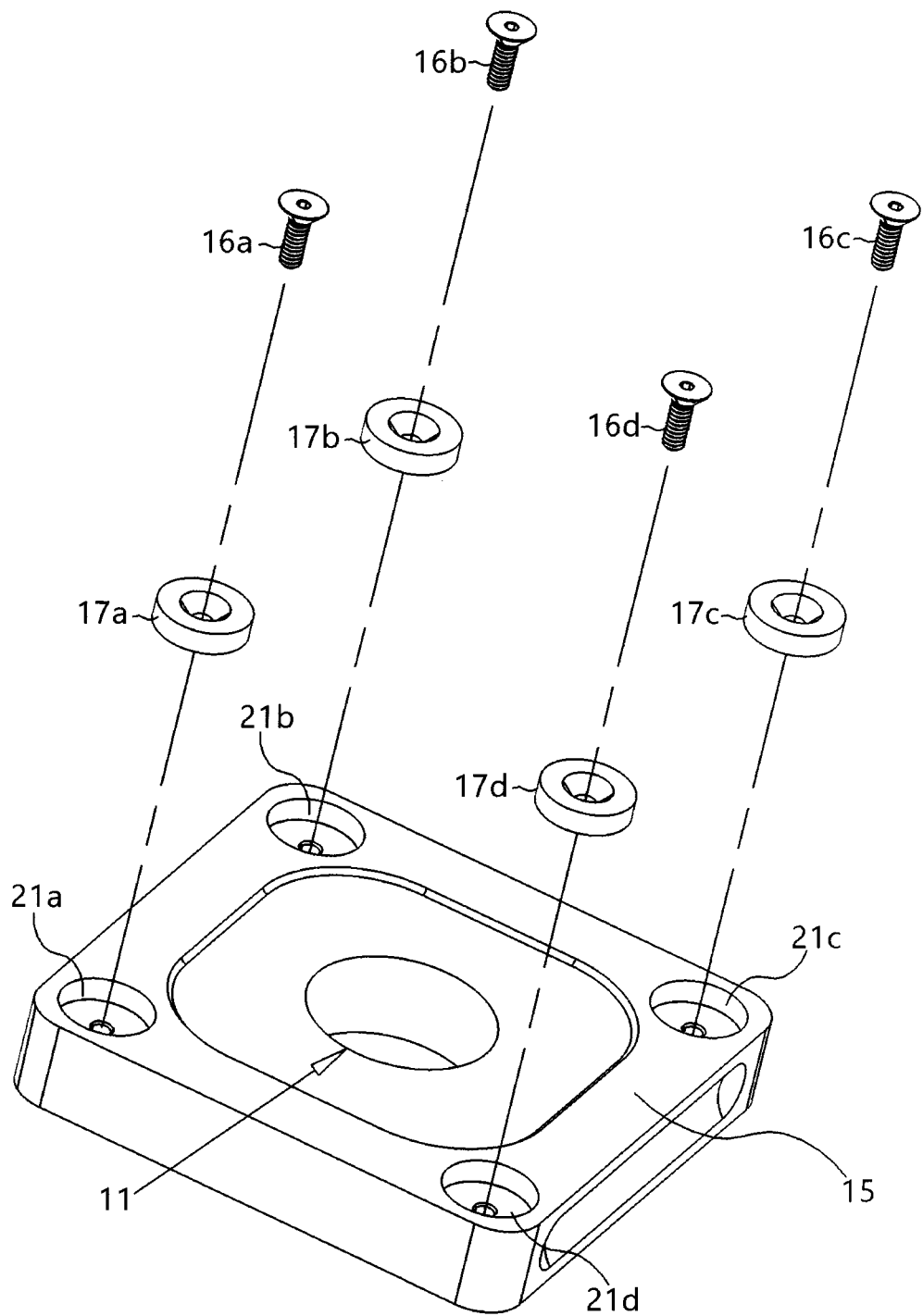
FIG. 6A is a bottom exploded perspective view of the alternate embodiment.

FIG. 6A is a perspective bottom exploded view of the alternate embodiment of the invention prepared for installation. This view shows the magnetic inserts 17a, 17b, 17c, and 17d for installation with the fasteners 16a, 16b, 16c, and 16d, where the fasteners are connectors and alternatively bolts, into the pockets 21a, 21b, 21c, and 21d respectively. The device's bottom surface 15 shows the four pockets 21a, 21b, 21c, and 21d that have more depth than the thickness of the magnetic inserts 17a, 17b, 17c, and 17d as well as a slightly larger diameter. These larger sizes allow for the magnetic inserts 17a, 17b, 17c, and 17d to slip fit into the device's pockets, 21a, 21b, 21c, and 21d, resting below the bottom surface 15. These close tolerance fits prevent dirt and debris from accumulating and preventing the bottom surface 15 from resting flat during use. The depth of each pocket, 21a, 21b, 21c, and 21d, is slightly deeper than the thickness of the magnetic inserts 17a, 17b, 17c, and 17d and thus allows the device to attract to magnetic planar surfaces while maintaining a flat setup. The magnetic inserts 17a, 17b, 17c, and 17d have countersinks to accept shallow fastener heads and thus maintain magnetic attraction.

Figure 6B:
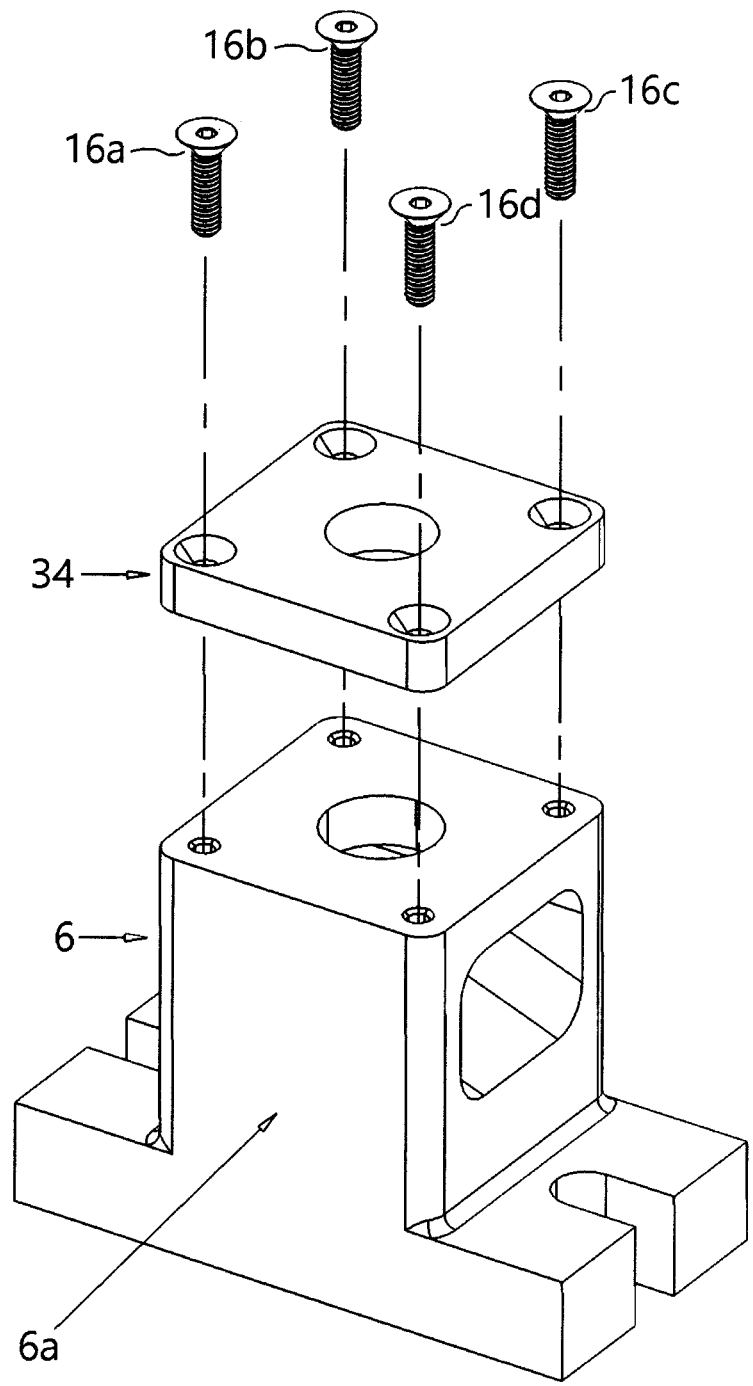
FIG. 6B is a perspective view of the preferred embodiment in usage.

FIG. 6B shows a perspective exploded view of the preferred embodiment in usage. Here, the device 34 has its planar form with the top surface spaced above the bottom surface by the thickness shown at the end and the side. The device has its countersunk apertures proximate the corners that receive the fasteners 16a, 16b, 16c, and 16d. Each fastener has a length that extends through the countersunk aperture 23 and from the exit 24. The fasteners then approach a base 6 that has an upright elongated body 6a with two opposite outwardly extending feet. The fasteners secure into threaded apertures in the top of the base as later explained.

Figure 6F:
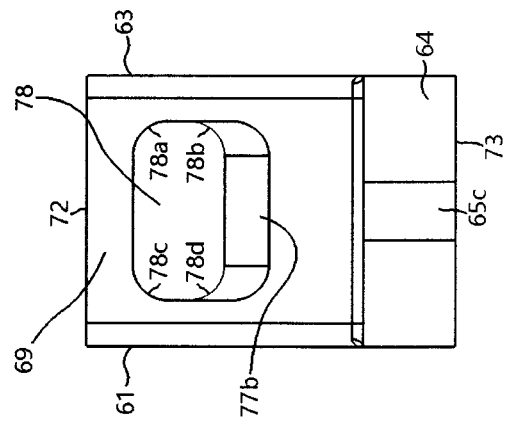
FIG. 6F is a side view opposite FIG. 6D of the preferred embodiment in usage.
Figure 6C:
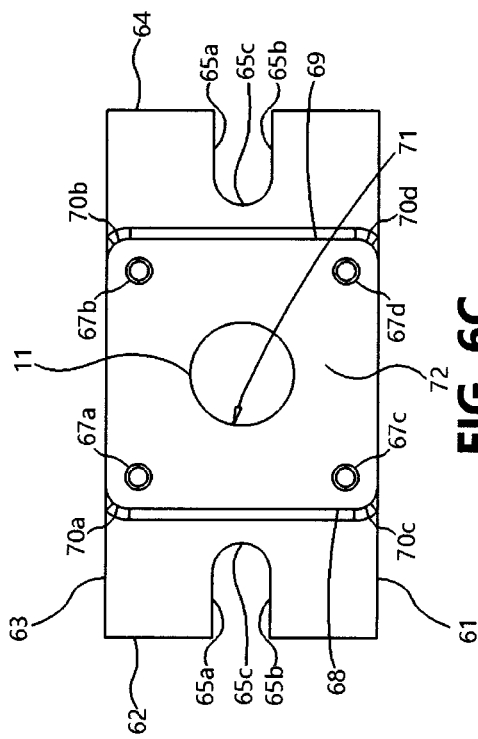
FIG. 6C is a top view of the preferred embodiment in usage.

FIG. 6C provides a top view of the preferred embodiment with the base 6 ready to accept the invention 34. The base 6 has it generally square body 6a here shown on end with its own top surface 72 shown in the foreground. This top surface 72 is flat, planar, and machined to 32 RMS as the top surface 11 of the invention. This top surface 72 includes a bore 11 into the body 6a. The bore extends partially into the body as later shown. This top surface 72 has four threaded apertures 67a, 67b, 67c, 67d evenly spaced and oriented to the corners of the body as shown. These four threaded apertures register with the exits 24a, 24b, 24c, 24d of the bottom surface 15. These four threaded apertures also receive the fasteners 16a, 16b, 16c, 16d extending from the exits of the bottom surface 15. Outwardly from each threaded aperture, this top surface 72 has a rounded corner, collectively shown as 70a, 70b, 70c, 70d. In the left of the figure, the two corners of the body round down, that is, into the plane to a left face 68 of the body 6a. In the right of the figure, the two corners of the body round down, that is, into the plane to a right face 69 of the body 6a. From the left of the figure, the base 6 has its first foot 62 into the plane of this figure. The first foot extends to the left of the body 6a from the left face 68 at a length less than half the width of the body. The first foot has its own width similar to that of the width of the body. Generally centered upon the first foot and collinear with the bore 11, the first foot has a slot formed of two spaced apart walls 65a, 65b joining to a rounded end 65c. The slot extends for the depth of the first foot but has a length less than that of the first foots. The spaced apart walls have a sufficient space to admit a component of a clamp.

The first foot has a front face 61, here shown towards the bottom, and a mutually parallel and spaced apart rear face 63. The front face and the rear face have a parallel orientation to the slot on the left and a perpendicular orientation to the height of the body 6a.

The front face and the rear face both extend to the right in this figure past the body 6a from the right face 69 and to a second foot 64. The second foot is symmetric to the left foot. The second foot also has a slot formed of two spaced apart walls 65a, 65b joining to a rounded end 65c as well. The slot extends for the depth of the second foot but has a length less than that of the second foot. The spaced apart walls have a sufficient space to admit a component of a clamp, similar to the first foot.

Figure 6E:
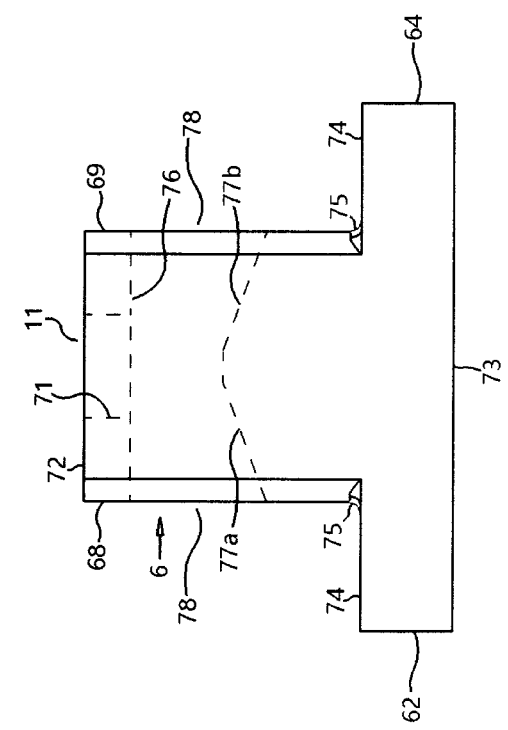
FIG. 6E is a front view of the preferred embodiment in usage.
Figure 6D:
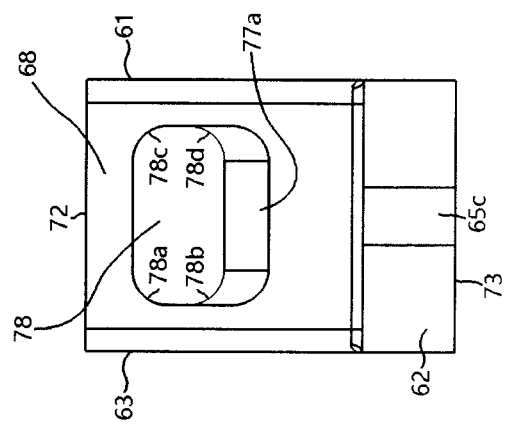
FIG. 6D is a side view of the preferred embodiment in usage.

Turning the base ninety degrees on two axes, FIG. 6D provides a side view of the body 6a with the left face 68 shown above the first foot 62. The first foot extends upwardly from a second bottom surface 73 and has its slot generally centered with the end 65c on dead center. The body 6a extends above the first foot 62 with the rear face 63 here shown to the left and the front face 61 oppositely here shown to the right. The top surface 72 spans from the front face to the rear face and generally parallel to the left foot. Towards the center, the left face 68 has a chamber 78 formed therein of a prismatic sloped rectangular form. The chamber forms from four spaced apart rounded corners 78a, 78b, 78c, 78d extending into the body 6a. Between the two lower corners, the chamber has a sloped ramp 77a extending upwardly, that is, away from the first foot, and inwardly into the body 6a. The ramp has a generally flat surface from side to side between the two lower corners, 78b, 78d as shown.

Rotating the body 6a clockwise ninety degrees, FIG. 6E describes a front view of the preferred embodiment. The base 6 has its second bottom surface 73 as before and this figures shows the first foot 62 to the left and the second foot 64 to the right. Opposite the second bottom surface the first foot and the second foot both have an instep 74, generally a flat surface spaced above the second bottom for the thickness of the feet. The insteps merge to the left face 68 and the right face 69 with a rounded corner as at 75. Above the feet, the body 6a has the chamber 78 extending into it, here shown on the side. The chamber has its sloped ramp 77a toward the left and rising upwardly into the body to about the midpoint. The chamber then has a reverse sloped ramp 77b toward the right and declining form the peak of ramp 77a. The reverse sloped ramp 77b is a mirror image of ramp 77a. Spaced above the ramps 77a, 77b, the chamber 78 has a roof 76. The roof has a generally flat surface parallel to the second bottom. The roof extends across the length of the body and for the width of the chamber. The roof also receives the bore 11 in communication. The bore presents a perimeter wall 71 into the top surface 72 of the body. The bore receives an indicator, or other tool, not shown, and any shaving, oils, debris, and waste during usage. The debris falls through the bore and enters the chamber. Under gravity, the debris falls through the chamber and lands upon sloped ramp 77a and reverse sloped ramp 77b. The two ramps have an angle upwardly from the plane of the second bottom surface. The angle presents a surface where the gravitational pull overcomes the friction of the debris to the body. Thus, the debris gently slides out of the chamber thus leaving the bore clear of debris. The angle of the ramps has a proportion to the highest coefficient of friction of debris related to the material of the body 6a.

Rotating the body once more ninety degrees, FIG. 6F shows a side view opposite that of FIG. 6D of the preferred embodiment of the body 6a with the right face 69 shown above the second foot 64. The second foot extends upwardly from the second bottom surface 73 with its slot generally centered with the end 65c on dead center. The body 6a extends above the second foot 64 with the front face 61 here shown to the left and the rear face 63 oppositely here shown to the right. The top surface 72 spans from the front face to the rear face as before and generally parallel to the left foot. Towards the center, the right face 69 has the chamber 78 formed therein of a prismatic sloped rectangular form from its four spaced apart rounded corners 78a, 78b, 78c, 78d extending into the body 6a. Between the two lower corners, the chamber has a reversed sloped ramp 77b extending upwardly, that is, away from the second foot, and inwardly into the body 6a. The reversed slope ramp has a generally flat surface from side to side between the two lower corners, 78b, 78d as shown.

Figure 6J:
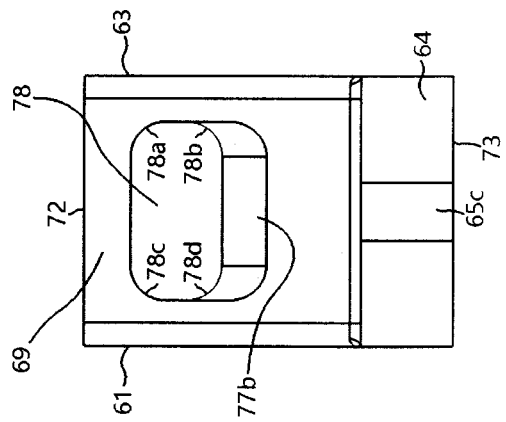
FIG. 6J is a side view opposite FIG. 6H of the alternate embodiment in usage.
Figure 6G:
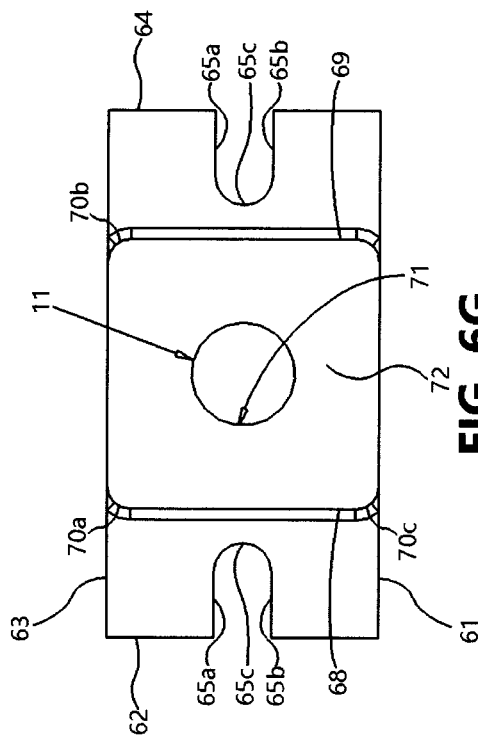
FIG. 6G is a top view of the alternate embodiment in usage.

FIG. 6G is a top view of the alternate embodiment of the body ready to receive the magnetic style of the device. This figure is similar to FIG. 6c except for the top surface 72. In this embodiment, the top surface is flat and planer to the 0.0002 in tolerance as described above. The top surface also has magnetic material therein that attracts the magnetic inserts previously shown, as in FIG. 6a. The top surface has its bore 11 with a perimeter wall 11 into the body 6a. in usage; FIG. 6H provides a side view the alternate embodiment of the preferred embodiment of the base 6, more particularly of the body 6a with the left face 68 shown above the first foot 62. FIG. 6H is similar to FIG. 6d and the description above is incorporated by reference.

Figure 6I:
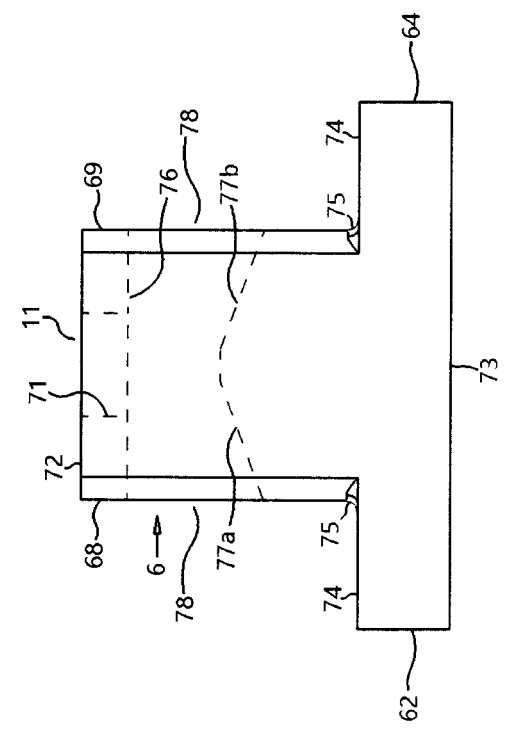
FIG. 6I is a front view of the alternate embodiment in usage.
Figure 6H:
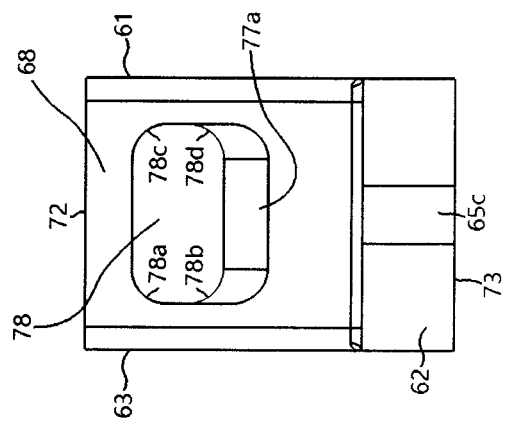
FIG. 6H is a side view of the alternate embodiment in usage.

FIG. 6I illustrates a front view of the alternate embodiment of the preferred embodiment of the base 6. The base 6 has its second bottom surface 73 as before and this figure shows the first foot 62 to the left and the second foot 64 to the right. This figure also shows the chamber 78. FIG. 6I is similar to FIG. 6E and the description above is incorporated by reference.

FIG. 6J shows a side view opposite that of FIG. 6H of the alternate embodiment of the body 6a with the right face 69 shown above the second foot 64. This figure also shows the chamber 78 with the reverse slope ramp 77b. FIG. 6J is similar to FIG. 6H and the description above is incorporated by reference.

Figure 7:
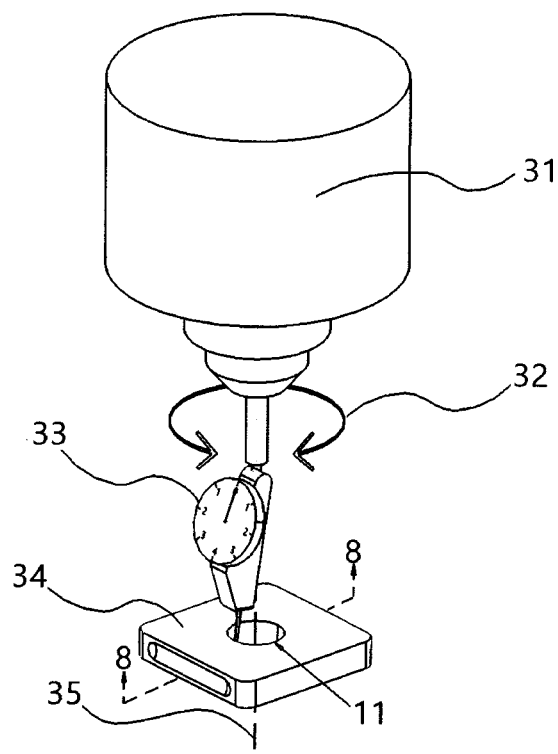
FIG. 7 is perspective view of the invention in usage.

FIG. 7 shows a perspective view of how the device 34 used with a spindle 31 of a machine tool. The device's precision bore's 11 centerline, as at 35, aligns with the machine tool's spindle 31 with its test indicator 33 also on the same centerline. The spindle 31 slowly rotates to find this centerline 35. Once the centerline of the spindle aligns with the device's center 35, the test indicator 33 will display the same reading during rotation shown as at 32. The rotation 32 direction of the spindle 31 turns in either a clockwise or a counterclockwise direction. The spindle 31 with the indicator 33 references the device's precision bore 11.

Figure 8:
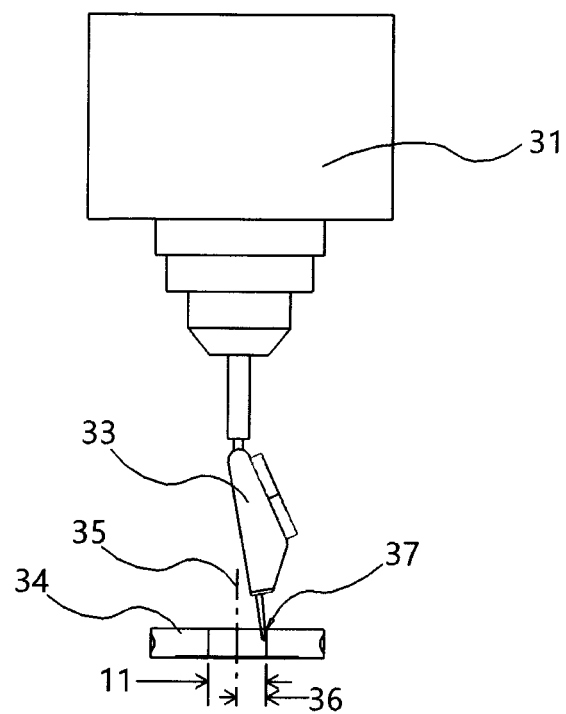
FIG. 8 is a side view of the invention in usage.

FIG. 8 shows a side sectional view of the device 34 that receives a spindle 31 of a machine tool. The spindle 31 aligns with the same centerline as the device's precision bore's centerline, as at 35. The test indicator 33 has its point of contact 37, as it is loaded, against the device's precision bore 11. As the test indicator 33 receives its load, the distance between the point of contact 37 and the spindle centerline now equals one half of the value of the diameter of the precision bore 11. This known value, as at 36, then sees use as an offset to measure surfaces at a radial distance from the spindle 31.

FIG. 9 shows a front view of the device 34 installed and setup in a machine tool 41. The device 34 rests flat on a work piece 43. The spindle 31 then aligns to the same centerline as the device's precision bore's centerline 35. The test indicator 33 then has its loaded point of contact 37 against the device's precision bore 11. The spindle 31 follows the centerline of the device's precision bore 11. As the test indicator 33 has its load increase, the distance between the point of contact 37 and the spindle centerline now equals one half of the value of the precision bore 11. The machine tool digital readout 42 then records and stores the current machine coordinates of the device 34. In this figure, the test indicator 33 had its load at a radial value displaying the same indicator reading as it rotates around the centerline of the device 34.

FIG. 9a is an enlarged detail view of FIG. 9. This figure shows the spindle 31 in close contact to the device 34 upon the wall of the bore 11. The device rests upon a work piece wherein the top surface of the device reflects the degree of flatness of the work piece. Preferably, the top surface of the device has a parallel orientation, within tolerance, to the work piece's top surface.

FIG. 10 shows a front view of the machine tool 41 using the setting that the device 34 has captured. This figure shows how the spindle 31, indicator 33, and the digital readout 42 cooperatively measure the work piece 43. Once the spindle 31 and test indicator 33 become aligned, previously shown in FIG. 9, this known radial value 36, or offset, qualifies surfaces on work pieces. Using the machine tool's digital readout 42 the centerline 44 of the machine tool's spindle 31 then has an offset of one half of the value of the device's precision bore 11 to measure the periphery of the work piece 43. This measurement occurs using the test indicator 33 at the highest point of contact 37 as it carries its load against the work piece 43. In this figure, the radial measurement 36 only appears when the indicator 33 reaches its highest peak at the point of contact 37 with the work piece 43.

FIG. 10a provider an enlarged detail view of FIG. 10. This figure illustrates the work piece having a shift to the right, compared to FIG. 9A. The shift to the right results in the work piece having a position away from the centerline 35 measured by the offset 36.

FIG. 11 has a top view of a work piece surface to verify the present invention. The work piece surface has a generally rectangular shape as shown where surface has dimensions of approximately 40 in. by 24 in. The 40 in dimension represents the longitudinal sides of the work piece, that is, the length. The 24 in dimension represents the lateral side of the work piece, that is, the width and the lateral sides are perpendicular to the longitudinal sides. Centered in the work piece, this surface has a target origin shown as the cross hairs having the 0 indicia. Outwardly slightly from the lateral sides along a line bisecting the width of the work piece, the invention cooperates in taking measurements at points R20 and R21 as shown. Upwardly and downwardly slightly from the longitudinal sides along a line bisecting the length of the work piece, the invention cooperates in taking measurements at points R22 and R23 as shown.

FIG. 12 describes a table of results from verifying the present invention. A machinist places the invention upon the origin of the work piece as shown in FIGS. 9, 10. The machinist then measures from the bore 11 to the lateral target points R20, R21 of FIG. 11. These measurements yield the table data for R20, R21 about the spindle centerline position, the surface target size, the indicator reading at each point, the actual surface dimension, and the combined overall size from the summation of the average true range of the two actual surface readings. This actual overall size shows the actual length of the work piece.

Similarly, the machinist then measures from the bore 11 to the longitudinal target points R22, R23 of FIG. 11. These measurements yield the table data for R22, R23 about the spindle centerline position, the surface target size, the indicator reading at each point, the actual surface dimension, and the combined overall size from the summation of the average true range of the two actual surface readings. This actual overall size shows the actual width of the work piece.

While a preferred embodiment of the inspection setup block has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as plastic, polymer, metal, composite, may be used. Although providing an inspection setup block has been described, it should be appreciated that the inspection setup block herein described is also suitable for the optical, astronomical, metrological, and other industries that utilize precision positioned pieces.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Various aspects of the illustrative embodiments have been described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations have been set forth in order to provide a thorough understanding of the illustrative embodiments. However, it will be apparent to one skilled in the art that the present invention may be practiced without the specific details. In other instances, well known features are omitted or simplified in order not to obscure the illustrative embodiments.

Various operations have been described as multiple discrete operations, in a manner that is most helpful in understanding the present invention, however, the order of description should not be construed as to imply that these operations are necessarily order dependent. In particular, these operations need not be performed in the order of presentation.

Moreover, in the specification and the following claims, the terms "first," "second," "third" and the like—when they appear—are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to ascertain the nature of the technical disclosure. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. A device for mechanically aligning a test indicator at a radial value in a machine tool spindle upon a work piece, comprising:
   a non-magnetic body, said body having a top surface and an opposite bottom surface;
   a centered bore communicating through said top surface towards said bottom surface, said bore being perpendicular to said top surface and said bottom surface;
   four connectors communicating through said top surface towards said bottom surface, each of said connectors connecting said body to the work piece; and,
   said bore having a circularity.

2. The device for mechanically aligning a test indicator of claim 1 further comprising:
   said top surface and said bottom surface being mutually parallel and spaced apart;
   said body having two mutually parallel and spaced apart ends and two mutually parallel and spaced apart sides, said sides being perpendicular to said top surface and said ends being perpendicular to said top surface and said sides; and,
   said bore having a circularity no more one ten-thousandths of an inch.

3. The device for mechanically aligning a test indicator of claim 1 wherein said bore has a circularity no more one ten-thousandths of an inch.

4. The device for mechanically aligning a test indicator of claim 2 further comprising:
   said body having four corners, each of said corners positioning proximate an apparent intersection of one end and one side;
   each of said connectors comprising a threaded aperture through said body proximate a corner and a threaded bolt cooperatively engaging said threaded aperture and having a length greater than the spacing between said top surface and said bottom surface; and,
   a base, said base having a top surface mutually parallel to the top surface of said body, said top surface of said base having four threaded apertures in registration with each of said threaded bolts wherein engagement of said threaded bolts into said threaded apertures secures said body to said base for usage.

5. The device for mechanically aligning a test indicator of claim 4 further comprising:
   said apertures in said body each having a countersink proximate said top surface.

6. The device for mechanically aligning a test indicator of claim 4 further comprising:
   said base having a body beneath said top surface of said base, said body having a left face and a right face mutually parallel and spaced apart, said left face and said right face being perpendicular to said top surface of said base; and,
   a chamber within said body opening through said left face and said right face, said chamber having a ramp extending upwardly towards said top surface into said left face and a reverse ramp extending upwardly towards said bottom surface into said right face, a roof above said ramp and said reverse ramp, said roof being mutually parallel and beneath said top surface, and said top surface of said base having a bore through said roof, wherein said ramp and said reverse ramp have an angle from said top surface wherein debris self-exits said chamber.

7. The device for mechanically aligning a test indicator of claim 2 further comprising:
   said body having four corners, each of said corners positioning proximate an apparent intersection of one end and one said side; and,
   each of said connectors comprising a pocket proximate a corner and positioned in said bottom surface, a magnetic insert placed into said pocket, and a bolt securing said magnetic insert into said pocket.

8. The device for mechanically aligning a test indicator of claim 7 further comprising:
   each of said pockets having a countersink upwardly from said bottom surface wherein said bolt remains contained above said bottom surface.

9. The device for mechanically aligning a test indicator of claim 8 further comprising:
   a base, said base having a top surface mutually parallel to the top surface of said body, said top surface of said base having four threaded apertures in registration with each of said threaded bolts wherein engagement of said threaded bolts into said threaded apertures secures said body to said base for usage;
   said base having a body beneath said top surface of said base, said body having a left face and a right face mutually parallel and spaced apart, said left face and said right face being perpendicular to said top surface of said base; and,
   a chamber within said body opening through said left face and said right face, said chamber having a ramp extending upwardly towards said top surface into said left face and a reverse ramp extending upwardly towards said bottom surface into said right face, a roof above said ramp and said reverse ramp, said roof being mutually parallel and beneath said top surface, and said top surface of said base having a bore through said roof, wherein said ramp and said reverse ramp have an angle from said top surface thus debris, coolant, and cutting fluid exit from said chamber.

10. An aligning device for usage upon a work piece, comprising:
    a top surface and a mutually parallel and spaced apart bottom surface, a non-magnetic body, two mutually parallel and spaced apart ends and two mutually parallel and spaced apart sides, said sides being perpendicular to said top surface and said ends being perpendicular to said top surface and to said sides;
    said top surface, said bottom surface, said ends, and said sides defining a body
    said body having a centered bore communicating through said top surface towards said bottom surface, said bore being perpendicular to said top surface and said bottom surface;
    said bore having a circularity, said circularity being circularity no more one ten-thousandths of an inch; and,
    four connectors communicating through said top surface towards said bottom surface, each of said connectors connecting said body to the work piece.

11. The aligning device for usage upon a work piece of claim 10 further comprising:
    said body having four corners, each of said corners positioning proximate an apparent intersection of one end and one side;

each of said connectors comprising a threaded aperture through said body proximate a corner and perpendicular to said top surface and a threaded bolt cooperatively engaging said threaded aperture and having a length greater than the spacing between said top surface and said bottom surface, said threaded apertures of said body each having a countersink proximate said top surface; and, a base, said base having a top surface mutually parallel to the top surface of said body, said top surface of said base having four threaded apertures in registration with each of said threaded bolts wherein engagement of said threaded bolts into said threaded apertures secures said body to said base for usage.

12. The aligning device for usage upon a work piece of claim 11 further comprising:

said base having a body beneath said top surface of said base, said body having a left face and a right face mutually parallel and spaced apart, said left face and said right face being perpendicular to said top surface of said base; and, a chamber within said body opening through said left face and said right face, said chamber having a ramp extending upwardly towards said top surface into said left face and a reverse ramp extending upwardly towards said bottom surface into said right face, a roof above said ramp and said reverse ramp, said roof being mutually parallel and beneath said top surface, and said top surface of said base having a bore through said roof, wherein said ramp and said reverse ramp have an angle from said top surface thus debris, coolant, and cutting fluid exit from said chamber.

13. The aligning device for usage upon a work piece of claim 12 further comprising:

said body of said base having a left foot and an opposite right foot extending outwardly from said body mutually parallel and spaced below said top surface of said base;

said left foot being perpendicular to said left face and said right foot being perpendicular to said right face;

said left foot having a slot outwardly from said left face and said right foot having a slot outwardly from said right face; and, said slot of said left foot aligning with said slot of said right foot.

14. The aligning device for usage upon a work piece of claim 13 further comprising:

said chamber opening through said left face above said left foot and opening through said right face above said right foot.

15. The aligning device for usage upon a work piece of claim 10 further comprising:

said body having four corners, each of said corners positioning proximate an apparent intersection of one end and one said side;

each of said connectors comprising a pocket proximate a corner and positioned in said bottom surface, a magnetic insert placed into said pocket, and a bolt securing said magnetic insert into said pocket; and, each of said pockets having a countersink upwardly from said bottom surface wherein said bolt remains contained above said bottom surface.

16. The aligning device for usage upon a work piece of claim 15 further comprising:

a base, said base having a top surface mutually parallel to the top surface of said body, said top surface of said base having four threaded apertures in registration with each of said bolts wherein engagement of said bolts into said threaded apertures secures said body to said base for usage;

said base having a body beneath said top surface of said base, said body having a left face and a right face mutually parallel and spaced apart, said left face and said right face being perpendicular to said top surface of said base; and, a chamber within said body opening through said left face and said right face, said chamber having a ramp extending upwardly towards said top surface into said left face and a reverse ramp extending upwardly towards said bottom surface into said right face, a roof above said ramp and said reverse ramp, said roof being mutually parallel and beneath said top surface, and said top surface of said base having a bore through said roof, wherein said ramp and said reverse ramp have an angle from said top surface thus debris, coolant, and cutting fluid exit from said chamber.

17. The aligning device for usage upon a work piece of claim 16 further comprising:

said body of said base having a left foot and an opposite right foot extending outwardly from said body mutually parallel and spaced below said top surface of said base;

said left foot being perpendicular to said left face and said right foot being perpendicular to said right face;

said left foot having a slot outwardly from said left face and said right foot having a slot outwardly from said right face; and, said slot of said left foot aligning with said slot of said right foot.

18. The aligning device for usage upon a work piece of claim 17 further comprising:

said chamber opening through said left face above said left foot and opening through said right face above said right foot.

19. An aligning device for usage with a test indicator at a radial value in a machine tool spindle upon a work piece, the work piece receiving debris, coolant, and cutting fluid during usage, comprising:

a top surface and a mutually parallel and spaced apart bottom surface, a non-magnetic body, two mutually parallel and spaced apart ends and two mutually parallel and spaced apart sides, said sides being perpendicular to said top surface and said ends being perpendicular to said top surface and to said sides;

said top surface, said bottom surface, said ends, and said sides defining a body;

said body having four corners, each of said corners positioning proximate an apparent intersection of one end and one side;

said body having a centered bore communicating through said top surface towards said bottom surface, said bore being perpendicular to said top surface and said bottom surface;

said bore having a circularity, said circularity being circularity no more one ten-thousandths of an inch;

four connectors communicating through said top surface towards said bottom surface, each of said connectors connecting said body to the work piece; and, each of said connectors being one of:

a threaded aperture through said body proximate a corner and perpendicular to said top surface and a threaded bolt cooperatively engaging said threaded aperture and having a length greater than the spacing between said top surface and said bottom surface, said threaded apertures of said body each having a countersink proximate said top surface, and a countersunk pocket proximate a corner and positioned in said bottom surface, a magnetic insert placed into said pocket, and a threaded bolt securing said magnetic insert into said pocket, said countersink upwardly from said bottom surface wherein said threaded bolt remains contained above said bottom surface.

20. The aligning device for usage with a test indicator at a radial value in a machine tool spindle upon a work piece, the work piece receiving debris, coolant, and cutting fluid during usage of claim 19, further comprising:

a base, said base having a top surface mutually parallel to the top surface of said body, said top surface of said base having four threaded apertures in registration with each of said threaded bolts wherein engagement of said threaded bolts into said threaded apertures secures said body to said base for usage, a body beneath said top surface of said base, said body having a left face and a right face mutually parallel and spaced apart, said left face and said right face being perpendicular to said top surface of said base, said body having a left foot and an opposite right foot extending outwardly from said body mutually parallel and spaced below said top surface of said base, said left foot being perpendicular to said left face and said right foot being perpendicular to said right face, said left foot having a slot outwardly from said left face and said right foot having a slot outwardly from said right face, said slot of said left foot aligning with said slot of said right foot; and, a chamber within said body opening through said left face and said right face, said chamber having a ramp extending upwardly towards said top surface into said left face and a reverse ramp extending upwardly towards said bottom surface into said right face, a roof above said ramp and said reverse ramp, said roof being mutually parallel and beneath said top surface, and said top surface of said base having a bore through said roof, wherein said ramp and said reverse ramp have an angle from said top surface thus debris, coolant, and cutting fluid exit from said chamber, said chamber opening through said left face above said left foot and opening through said right face above said right foot.

\* \* \* \* \*